(No Model.)
E. ABBE.
BINOCULAR TELESCOPE.
No. 546,871. Patented Sept. 24, 1895.
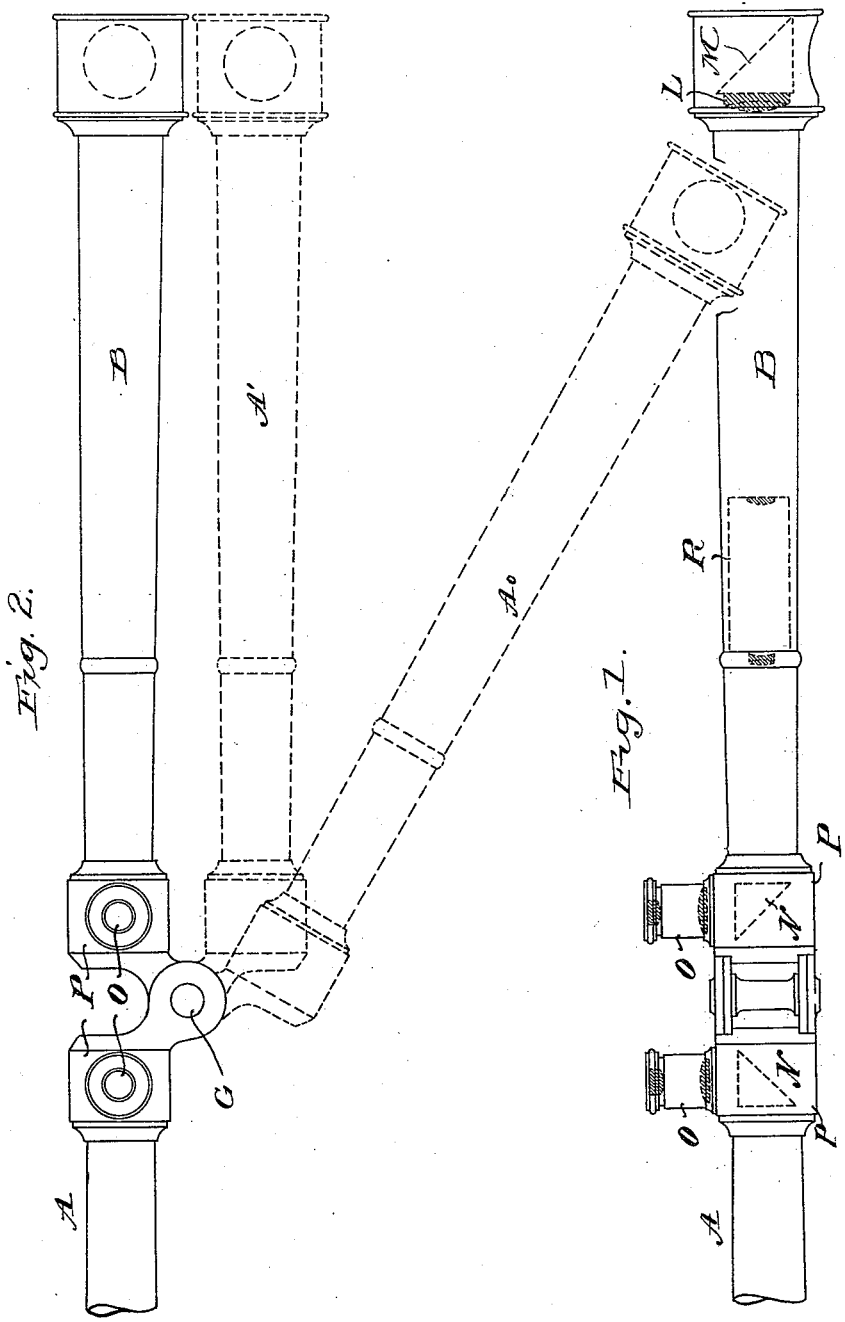
Witnesses
F. B. Keefer
Bruce D. Elliott
Inventor:
Ernst Abbe,
by Marcellus Bailey
his attorney.

UNITED STATES PATENT OFFICE.

ERNST ABBE, OF JENA, GERMANY, ASSIGNOR TO THE FIRM OF CARL ZEISS, OF SAME PLACE.

BINOCULAR TELESCOPE.

SPECIFICATION forming part of Letters Patent No. 546,871, dated September 24, 1895.

Application filed November 26, 1894. Serial No. 530,001. (No model.) Patented in Germany October 19, 1893, No. 76,735; in France March 12, 1894, No. 236,943; in Italy March 12, 1894, LXX, 318; in Switzerland March 15, 1894, No. 8,079; in England March 17, 1894, No. 5,639; in Austria March 25, 1894, No. 67,764, and in Hungary March 25, 1894, No. 7,509.

*To all whom it may concern:*

Be it known that I, ERNST ABBE, doctor of philosophy, a subject of the Grand Duke of Saxe-Weimar-Eisenach, residing at Jena, in the Grand Duchy of Saxe-Weimar-Eisenach, German Empire, have invented a new and useful Binocular Telescope, (for which I have obtained patents in Germany, No. 76,735, bearing date October 19, 1893; in Austria, No. 67,764, dated March 25, 1894; in Hungary, No. 7,509, dated March 25, 1894; in Switzerland, No. 8,079, dated March 15, 1894; in France, No. 236,943, dated March 12, 1894; in Italy, No. 318, Vol. LXX, dated March 12, 1894, and in Great Britain, No. 5,639, dated March 17, 1894,) of which the following is a specification.

The object of the novel construction of binocular telescopes hereinafter described is to enable two telescopes to be combined together to form a binocular glass in a more advantageous or convenient form than it is possible to obtain with two tubes arranged side by side and parallel with one another in the manner heretofore practiced. The essential feature of this construction is, first, that the direction of sight in both telescopes is situated at right angles with the axes of the tube, this result being obtained by twice deflecting the rays of light at an angle of ninety degrees by means of two reflecting-prisms, one of which is combined with the object-glass and the second having its principal section parallel with that of the first being combined with the eyepiece of the telescope, and, secondly, that the telescopes thus constructed with twofold deflection of the optical axes are connected together at the ends provided with the eyepieces by a hinge or joint or combination of joints enabling the two telescopes to be revolved relatively to one another similarly to the legs of a pair of compasses in a plane at right angles to the direction of sight.

In order that my invention may be fully understood, I shall now proceed more particularly to describe the same, and for that purpose shall refer to both figures on the annexed sheet of drawings, the same letters of reference indicating corresponding parts in both figures.

Figure 1 of the accompanying drawings represents in plan a portion of a binocular telescope constructed according to this invention. Fig. 2 represents the instrument in front elevation.

This instrument is constructed with two telescopes A and B, provided with object-glasses L. The object-glass of the telescope A is omitted from the drawings, being arranged in precisely the same way as that of the telescope B, hereinafter described. In front of the object-glass L of each telescope there is provided a right-angled isosceles reflecting-prism M, which may be cemented to the object-glass L, so as to form one piece therewith, whereby the optical axis at the objective end of the tube is deflected at an angle of ninety degrees. A second similar prism N, whose principal section is parallel with that of the prism M, is inserted near to and in front of the eyepiece O of each telescope—that is to say, between the eyepiece and a combination of lenses R, provided for the purpose of erecting the inverted image, so that by again deflecting the optical axis at an angle of ninety degrees in the plane of the principal sections of both prisms the said axis at the ocular end of the tube is directed parallel with that of the entering ray at the objective end of the tube, but at right angles with the axis of the tube itself.

The prism N in both telescopes is preferably contained in a rectangular metal case P, attached to the ends of the tubes, to which case the eyepiece O is attached. By means of the said square or rectangular end pieces P the two tubes are connected with the limbs of a joint or hinge G in such a manner that the axes of the two eyepieces O are exactly parallel with the axis of rotation of the joint, so that both tubes can be moved in a plane at right angles to the axis of the joint and to the direction of sight, similarly to the legs of a pair of compasses, and can be adjusted at different angles of divergence, as represented by the dotted lines in Fig. 2, for example.

The position of the pin of the joint relatively to the axes of the eyepieces of both telescopes is so regulated that, first, both tubes can be shut or folded together, so as to be parallel, or nearly so, with one another, the tube A being placed by the side of tube B, as represented by the dotted lines at A', Fig. 2, and, secondly, that by opening or separating the two limbs or members of the instrument they can be placed in either of two positions, in which the distance between the axes of the eyepieces can be adjusted from about fifty-eight to seventy-two millimeters, so as to suit the distance between the eyes of any observer in either of the two positions—namely, first, when the two tubes are opened out or caused to diverge at an angle of about thirty degrees, as represented in dotted lines A°, Fig. 2, corresponding with the medium distance of sixty-five millimeters between the eyes, and, secondly, when the two tubes are placed in a straight, or approximately straight, line with one another, as represented by full lines in the drawings.

This improved construction of binocular telescopes, compared with the instruments heretofore employed, is productive of the following advantages, namely: (a) The binocular telescope is much more easily handled, this being of special importance when the instrument is of large size. This applies to both positions of the tubes A and A°, Fig. 2, as in both cases the center of gravity of the instrument remains quite near to the head of the person using it. The use is the most comfortable in the position of small divergence of the tube A, Fig. 2, because in this case the tubes when turned downward by the observer form very convenient handles by which it can be held up to the eyes. (b) In the position of small divergence A, Fig. 2, the improved binocular glass enables observations to be taken from behind a wall or rampart, even when the latter projects above the head of the observer, by holding the tubes projecting upward. In this position the receiving-aperture of the object-glass is situated at a height above the eyes of the observer equal to nearly the entire length of the tubes. (c) The adjustment in the position represented by full lines at A, Fig. 2, in which the receiving-apertures of the object-glasses are separated by a distance equal to about twice the length of the tube in the direction of a connecting-line drawn between the two eyepieces affords a corresponding augmentation of the depth of perspective. The arrangement of the binocular telescope, as described, thus enables the principles of construction and action of the Helmholtz telestereoscope to be applied in a convenient form to a portable telescope.

Without prejudice to the advantages hereinbefore specified, the arrangements of the binocular glass illustrated in the drawings may be modified in various ways without changing the principles of construction with regard to the arrangement of the optical parts as well as with regard to the mechanical connection of the tubes.

With regard to the arrangement of the optical parts, it is to be observed, in the first place, that all kinds of telescopes presenting images in the erect or natural position may be employed, comprising, in addition to telescopes with terrestrial eyepieces, as in the example illustrated, Galilean telescopes and telescopes in which the erection of the image is effected by means of some suitable combination of prisms without the aid of the intermediate lens system usually provided with terrestrial eyepieces.

Apart from the different types of construction of the connected telescopes, the arrangement of the two deflecting-prisms employed to produce the double deflection of the optical axis may be modified in various ways, provided that one deflection takes place near the object-glass, while the other deflection (by which the optical axis is caused to take a direction parallel with that of the axis of the receiving-aperture) takes place near the eyepiece. Consequently the prism M, in place of being placed in front of the object-glass L, as represented in the drawings, may with equal advantage be situated behind the object-glass, and the prism N, in place of being close to the collecting-lens of the eyepiece O, may be placed farther from this lens and nearer to the eyeglass of the eyepiece, being arranged between the collecting-lens and the eyeglass, or behind the latter on the outer side of the eyeglass, according as it is desired to employ a longer or shorter mounting for the eyepiece.

It is evident that the reflecting-prisms employed in the arrangement hereinbefore described may be replaced by plane mirrors inclined at an angle of forty-five degrees with the axis of the tube; but this arrangement is not so advantageous.

With regard to the mechanical connection of the two telescopes by means of a joint or hinge, the essential point is simply to enable the two tubes to move like the legs of a pair of compasses in a plane at right angles to the axes of the eyepieces and while retaining the parallelism of the lines of sight to enable the distance between the eyepieces to be accurately adjusted to the distance between the eyes of the observer in at least one degree of divergence of the axes of the tubes. That the two tubes are symmetrically arranged relatively to the axis of rotation, so as to be in all their positions invariably symmetrical with the line connecting the two eyepieces, as represented in the drawings, is of little importance, and the same remark applies to the connection of the joint by a single pin. With equal advantage to a symmetrically-arranged joint a joint may be employed whose axis is unsymmetrical relatively to the axes of the eyepieces of the two telescopes and whose limbs are of unequal length and form correspondingly-unequal angles with the axes of the tubes. An arrangement of this description may be employed, for example, in order that when the eyepieces are adjusted to the medium distance between the eyes one tube may be in an approximately-horizontal position, while the other tube is in a vertical position, extending downward so as to form a convenient handle for supporting the instrument when in use. In like manner it may be advantageous in some cases, notwithstanding the greater difficulty of the mechanical construction to employ in place of one hinge with a single pin a combination of joints with two or more parallel axes for the purpose of enabling large telescopes to be folded up in the most compact form possible for traveling or for the purpose of obtaining a greater variety of positions of the two tubes, with a distance between the eyepieces corresponding to the distance between the eyes than it is possible to obtain with one single joint.

Having now particularly described and ascertained the nature of my said invention and in what manner the same is to be performed, I declare that what I claim is—

1. The combination with two telescopes each presenting images in the erect or natural position and having the optical axes of the objective or object glass apertures and of the ocular or eye piece apertures parallel with one another and at right angles to the optical axis of the tube of the telescope and both arranged with the same direction of sight and so as to form a binocular double telescope, of means enabling either telescope to be rotated relatively to the other in the plane common to their tubes, substantially as shown and described.

2. The combination with two telescopes each presenting images in the erect or natural position and having the optical axes of the objective or object glass apertures and of the ocular or eye piece apertures parallel with one another and at right angles to the optical axis of the tube of the telescope and both arranged with the same direction of sight and so as to form a binocular double telescope, of a hinge connecting two arms symmetrically attached to the ocular ends in the plane common to their tubes so as to enable either telescope to be rotated relatively to the other at an angle of about one hundred and eighty degrees the distance of the ocular apertures during this movement being in two different positions equal to the distance of the human eyes.

In testimony whereof I have hereunto set my hand in the presence of two subscribing witnesses.

ERNST ABBE.

Witnesses:
S. CRAPSKI,
N. FISCHER.